United States Patent
Cheon et al.

(10) Patent No.: US 10,974,231 B2
(45) Date of Patent: Apr. 13, 2021

(54) HIERARCHICAL EU-2 TYPE ZEOLITE HAVING BOTH MICROPORES AND MESOPORES, AND PREPARATION METHOD THEREFOR

(71) Applicant: SK Innovation Co., Ltd., Seoul (KR)

(72) Inventors: Young-Eun Cheon, Daejeon (KR); Seon-Ju Lim, Daejeon (KR); Tae-Jin Kim, Daejeon (KR); Chang-Q Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 16/608,997

(22) PCT Filed: Apr. 30, 2018

(86) PCT No.: PCT/KR2018/005013
§ 371 (c)(1),
(2) Date: Oct. 28, 2019

(87) PCT Pub. No.: WO2018/199714
PCT Pub. Date: Nov. 1, 2018

(65) Prior Publication Data
US 2020/0139355 A1    May 7, 2020

(30) Foreign Application Priority Data
Apr. 28, 2017   (KR) .................. 10-2017-0054985
Apr. 27, 2018   (KR) .................. 10-2018-0049423

(51) Int. Cl.
*C01B 39/48* (2006.01)
*B01J 29/70* (2006.01)
(Continued)

(52) U.S. Cl.
CPC ......... *B01J 29/703* (2013.01); *B01J 35/1019* (2013.01); *B01J 35/1038* (2013.01);
(Continued)

(58) Field of Classification Search
CPC ....... C01B 39/48; B01J 29/041; B01J 29/703; B01J 35/109; B01J 35/1019;
(Continued)

(56) References Cited

U.S. PATENT DOCUMENTS

| 6,923,949 B1 | 8/2005 | Lai et al. |
| 2009/0156389 A1 | 6/2009 | Ryoo et al. |

(Continued)

FOREIGN PATENT DOCUMENTS

| KR | 1020070001216 A | 1/2007 |
| KR | 1020070041239 A | 4/2007 |

(Continued)

OTHER PUBLICATIONS

Robson et al, "Verified Synthesis of Zeolitic Materials", Elsevier 2001 (Year: 2001).*

(Continued)

*Primary Examiner* — David M Brunsman
(74) *Attorney, Agent, or Firm* — The Webb Law Firm (57) ABSTRACT

The present invention provides a method for preparing hierarchical zeolite and hierarchical zeolite prepared thereby. The method includes the steps of: carrying out a reaction of a mixture containing water, a silica precursor, an alumina precursor, a pH adjustment material, at least one structure-inducing material, and at least one surfactant; and carrying out drying and heat treatment. The structure-inducing material and the surfactant have different carbon atoms while the surfactant has more carbon atoms than the structure-inducing material.

18 Claims, 6 Drawing Sheets

(51) Int. Cl.
*B01J 35/10* (2006.01)
*B01J 37/00* (2006.01)
*B01J 37/04* (2006.01)
*B01J 37/08* (2006.01)
*C10G 45/64* (2006.01)

(52) U.S. Cl.
CPC ........... *B01J 35/1061* (2013.01); *C01B 39/48* (2013.01); *B01J 29/70* (2013.01); *B01J 37/0018* (2013.01); *B01J 37/04* (2013.01); *B01J 37/08* (2013.01); *C10G 45/64* (2013.01); *C10G 2300/70* (2013.01)

(58) Field of Classification Search
CPC ................ B01J 35/1038; B01J 35/1057; B01J 35/1061; C01P 2006/12; C01P 2006/14; C01P 2006/17
See application file for complete search history.

(56) References Cited

U.S. PATENT DOCUMENTS

| | | | |
|---|---|---|---|
| 2013/0183231 A1 | 7/2013 | Senderov et al. | |
| 2015/0112110 A1 | 4/2015 | Lee et al. | |
| 2015/0122124 A1 | 5/2015 | Kwon et al. | |
| 2017/0157598 A1 | 6/2017 | Chal et al. | |
| 2020/0062604 A1* | 2/2020 | Kamakoti | B01J 29/70 |

FOREIGN PATENT DOCUMENTS

| | | | |
|---|---|---|---|
| KR | 1020150046398 A | 4/2015 | |
| KR | 1020150052680 A | 5/2015 | |
| KR | 1020170028415 A | 3/2017 | |

OTHER PUBLICATIONS

Mendes et al, "A systematic study on mixtures of Pt/zeolite as hydroisomerization catalysts†" Catal. Sci. Technol., 2017, 7, 1095-1107 (Year: 2017).*

Mendes et al, "A systematic study on mixtures of Pt/zeolite as hydroisomerization catalysts†" Catal. Sci. Technol., 2017, 7, Appendix A (Year: 2017).*

Astafan et al, "Synthesis of hierarchical ZSM-48 nano-zeolites†", New J. Chem., 2018, 42, 4457 (Year: 2018).*

Beck et al, "Molecular or Supramolecular Tennplating: Defining the Role of Surfactant Chemistry in the Formation of Microporous and Mesoporous Molecular Sieves" Chem. Mater. 1994, 6, 1816-1821 (Year: 1994).*

Suzuki et al, "The effects fo seeding in the synthesis of zeolite ZSM-48 in the presence of tetramethylammonium ion", Microporous and Mesoporous Materails, 77, 2-3, pp. 131-137, 2005 (Year: 2005).*

Chal et al., "Pseudomorphic synthesis of mesoporous zeolite Y crystals", Chemical Communication, 2010, pp. 7840-7842, vol. 46, No. 41.

Choi et al., "Amphiphilic organosilane-directed synthesis of crystalline zeolite with tunable mesoporosity", Nature Materials, 2006, pp. 718-723, vol. 5, No. 9.

Liu et al., "Synthesis and Characterization of Hierarchical ZSM-48 zeolite", Advanced Materials Research, 2012, pp. 756-759, vols. 503-504.

* cited by examiner

HIERARCHICAL EU-2 TYPE ZEOLITE HAVING BOTH MICROPORES AND MESOPORES, AND PREPARATION METHOD THEREFOR

CROSS-REFERENCE TO RELATED APPLICATIONS

This application is the United States national phase of International Application No. PCT/KR2018/005013 filed Apr. 30, 2018, and claims priority to Korean Patent Application Nos. 10-2017-0054985 filed Apr. 28, 2017, and 10-2018-0049423 filed Apr. 27, 2018, the disclosures of which are hereby incorporated by reference in their entirety.

TECHNICAL FIELD

The present invention relates to a hierarchical EU-2 zeolite having characteristics of both micropore and mesopore and a method of manufacturing the same.

BACKGROUND ART

EU-2 zeolites are applied to industrially important hydrodewaxing processes. Conventionally known EU-2 zeolites, however, only have micropores having a diameter less than 2 nm and thus are disadvantageous in reactions with oils having a high boiling point, such as lube base oil, diesel oil, and the like, when the oils diffuse thereinto.

To resolve such disadvantage, there have been attempts to introduce mesopores as sufficiently big as 2 nm to 50 nm in size so that the oils can smoothly diffuse. In particular, zeolites having a hierarchical porous structure in which micropores and mesopores are hierarchically connected to each other facilitate diffusion of a material, thereby providing advantageous activity particularly in hydroisomerization.

According to conventional technology for the manufacture of such hierarchical zeolites, a method of melting zeolites having micropores in a basic solution to add mesopores thereto has mainly been used; however, such method not only makes it difficult to obtain a sample with high reproducibility and requires additional processes flux properties but also reduce an amount of zeolites, thereby reducing overall yield as well as economic feasibility.

DISCLOSURE

Technical Problem

The present disclosure is to provide a zeolite for application to hydrodewaxing of oils, such as lube base oil, diesel oil, and the like, having a high boiling point, where the zeolite has a hierarchical porous structure in which sufficiently large mesopores having a diameter of 2 nm to 50 nm are introduced to a conventional EU-2 zeolite in which micropores having a size of less than 2 nm are present so that the micropores and the mesopores are hierarchically connected, and is to further provide advantageous activity particularly in hydroisomerization by facilitating diffusion of a substance through the zeolite.

The present disclosure have developed a method for manufacturing a hierarchical EU-2 zeolite, which was not practical in the prior art. The present disclosure is to provide a method for manufacturing a zeolite, involving forming an EU-2 crystal by a structural directing agent and additionally applying a surfactant enabling an introduction of a mesopores to simplify the manufacturing process and obtain the zeolite with high reproducibility in high yield.

Technical Solution

An aspect of the present invention is to provide a method for manufacturing a hierarchical EU-2 zeolite. According to an exemplary embodiment, the present invention provides a method for manufacturing a hierarchical EU-2 zeolite, the method including reacting a mixture comprising water, a silica precursor, an alumina precursor, a pH adjusting material, at least one structural directing agent and at least one surfactant, drying and heat-treating, where the structural directing agent and the surfactant have different numbers of carbon atoms, the surfactant having a larger number of carbon atoms than the structural directing agent.

A main chain of the structural directing agent has 10 carbon atoms or less and has an ammonium functional group, and that of the surfactant has 11 carbon atoms or more and has an ammonium functional group.

The structural directing agent may be at least one selected from the group consisting of tetramethylammonium bromide, tetramethylammonium chloride, tetramethylammonium hydroxide, tetraethylammonium bromide, tetraethylammonium chloride, tetraethylammonium hydroxide, tetraethylammonium tetrafluoroborate, hexamethonium chloride, hexamethonium bromide.

The surfactant may be at least one selected from the group consisting of cetyltrimethylammonium bromide, cetyltrimethylammonium chloride and cetylpyridinium chloride.

The silica precursor may be at least one selected from the group consisting of silicate, silica gel, fumed silica, precipitated silica, colloidal silica, sodium silicate, tetramethyl orthosilicate, tetraethyl orthosilicate, borosilicate and fluorosilicate.

The alumina precursor may be at least one selected from the group consisting of sodium aluminate, sodium aluminum sulfate and aluminum.

The pH adjusting material may be at least one selected from the group consisting of lithium hydroxide, sodium hydroxide, potassium hydroxide, rubidium hydroxide, cesium hydroxide and ammonium hydroxide.

It is preferable that the mixture contain the silica in a molar ratio of 0.05 to 0.13 to water.

It is preferable that the mixture contain the surfactant at a molar ratio of 1/200 to 1/20 to the silica It is preferable that the mixture contain the structural directing agent at a molar ratio of 1/160 to 1/38 to silica.

The mixture may further include a EU-2 seed.

The mixture may be allowed to sit to react after mixing for 30 minutes to 24 hours.

The mixture may be allowed to be gelled at room temperature (25° C. to 80° C. for 3 hours to 24 hours).

It is preferable that the reaction be carried out at a temperature in the range of 140° C. to 190° C. for 24 hours to 72 hours.

As another aspect, the present disclosure provides an EU-2 zeolite, where the EU-2 zeolite has an EU-2 crystal structure and includes micropores having a diameter of less than 2 nm and mesopores having a diameter of 2 nm to 50 nm, which are hierarchically connected, and has a hierarchical porous structure, a first hierarchical index of which is 0.10 to 0.40.

It is preferable that the EU-2 zeolite have a surface area of the micropores of 140 $m^2/g$ to 240 $m^2/g$ and a surface area of the mesopores of 40 $m^2/g$ to 110 $m^2/g$.

It is preferable that the EU-2 zeolite have a SAR of 90 to 160.

It is preferable that the EU-2 zeolite have a total BET surface area of 190 m$^2$/g to 310 m$^2$/g.

It is preferable that the EU-2 zeolite have a second hierarchical index of 0.50 to 0.90.

It is preferable that the EU-2 zeolite have a micropore volume of 0.060 cm$^3$/g to 0.09 cm$^3$/g.

Advantageous Effects

According to the present disclosure, an EU-2 zeolite containing not only micropores but also mesopores can be provided. Conventionally, an additional process of treating an EU-2 zeolite having micropores in a basic solution was required after the Eu-2 zeolite was prepared to be endowed with mesopores. According to the present disclosure, however, mesopores can be formed during synthesis of the EU-2 zeolites, thereby simplifying the manufacture process and significantly reducing an amount of loss of the zeolite and thus improving final synthetic yield.

Further, mesopores are formed between first particles containing the micropores to form second particles, thus allowing the EU-2 zeolite to include moth micropores and intercrystallization mesopores. It is also advantageous in that as the micropores and the mesopores are hierarchically formed, diffusion speed of a reactant and a product is accelerated and macromolecules can be diffused.

BEST MODE

Hereinafter, the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

The present disclosure provides a method for manufacturing a hierarchical EU-2 zeolite. Specifically, the method includes reacting a mixture containing water, a silica precursor, an alumina precursor, a pH adjusting material, at least one structural directing agent and at least one surfactant, and drying and heat-treating the same.

The silica precursor may be, for example, selected from the group consisting of silicate, silica gel, fumed silica, precipitated silica, colloidal silica, sodium silicate, tetramethyl orthosilicate, tetraethyl orthosilicate, borosilicate and fluorosilicate. They may be used independently or in combination of two or more.

The alumina precursor may be, for example, selected from the group consisting of sodium aluminate, sodium aluminum sulfate and aluminum. They may be used independently or in combination of two or more.

The pH adjusting material may be, for example, selected from the group consisting of lithium hydroxide, sodium hydroxide, potassium hydroxide, rubidium hydroxide, cesium hydroxide and ammonium hydroxide. They may be used independently or in combination of two or more.

The method for manufacturing a hierarchical zeolite involves injecting a structural directing agent and a surfactant in a mixture containing water, a silica precursor, an alumina precursor and a pH adjusting material.

The hierarchical EU-2 zeolite of the present disclosure is synthesized in a one-pot reaction using the structural directing agent and the surfactant. The one-pot reaction refers to synthesis of the hierarchical EU-2 zeolite in the presence of the structural directing agent and the surfactant. The structural directing agent induces synthesis of an EU-2 zeolite having micropores and formation of mesopores by the surfactant during crystallization of a seed of the synthesized EU-2 zeolite.

The hierarchical EU-2 zeolite having both micropores and mesopores can be manufactured by injecting the surfactant together with the structural directing agent to allow the structural directing agent to function as a mold for the formation of an EU-2 zeolite structure and induce the EU-2 zeolite structure while allowing the surfactant to contribute to the formation of the mesopores.

Seeds are formed to have a zeolite structure by the structural directing agent, and thus-formed seeds aggregate around a micelle of the surfactant to form a bigger particle. The micelle inside the bigger particle, which is carbonized during calcination and removed, induces formation of the mesopores or broadening an interspace between the seeds by surfactant ions aggregating around the formed seeds, thereby forming the hierarchical EU-2 zeolite having both micropores and mesopores.

According to the present disclosure, the hierarchical EU-2 zeolite can be manufactured without using an additional seed, thereby reducing manufacturing costs. It is obvious that use of the seed in the same condition can improve crystallizability and particle uniformity.

The structural directing agent and the surfactant have different numbers of carbon atoms. In this regard, it is preferable that the surfactant have a larger number of carbon atoms than the structural directing agent.

The structural directing agent is a surfactant having an ammonium functional group and 10 carbon atoms or less on a main chain thereof, and may be, for example, selected from the group consisting of tetramethylammonium bromide, tetramethylammonium chloride, tetramethylammonium hydroxide, tetraethylammonium bromide, tetraethylammonium chloride, tetraethylammonium hydroxide, tetraethylammonium tetrafluoroborate, hexamethonium chloride, hexamethonium bromide. They may be used independently or in combination of two or more. The structural directing agent preferably having 9 carbon atoms or less, 8 carbon atoms or less, 7 carbon atoms or less or 6 carbon atoms or less on the main chain may be used. For example, a surfactant having 10, 9, 8, 7, 6, 5, 4, 3 or 2 carbon atoms on the main chain and an ammonium functional group can be used as the structural directing agent.

The surfactant is a surfactant having an ammonium functional group and 11 or more carbon atoms on a main chain thereof, and may be, for example, selected from the group consisting of cetyltrimethylammonium bromide, cetyltrimethylammonium chloride and cetylpyridinium chloride. They may be used independently or in combination of two or more. The surfactant preferably having 11 carbon atoms or more, 12 carbon atoms or more, 13 carbon atoms or more, 14 carbon atoms or more, 15 carbon atoms or more or 16 carbon atoms or more on the main chain thereof can be used. For example, a surfactant having 11, 12, 13, 14, 15, or 16 carbon atoms on the main chain and an ammonium functional group can be used as the surfactant.

By the method of the present disclosure, a hierarchical EU-2 zeolite in which both micropores and mesopores are included and hierarchically connected can be obtained.

In the case of manufacturing the hierarchical Eu-2 zeolite, the uniformity and size of an overall crystal can be determined depending on how uniformly the silica precursor is dissociated in the basic aqueous solution and then polymerized to form a framework.

In this regard, the water may be contained in a molar ratio of silica to water in the range of 0.05 to 0.13. When the molar ratio of silica to water is above the appropriate range, yield may decrease, whereas when that is below the appropriate range, viscosity of the gel increases, thereby decreasing uniformity. The silica-to-water molar ratio is a factor controlling uniformity of a reaction, and thus can induce a uniform size of the crystal when satisfying such numerical range, thereby controlling the crystal size within a preferable range. More preferably, the molar ratio of silica to water may be 0.083 to 0.13.

In terms of the manufacturing of the hierarchical EU-2 zeolite, a molar ratio of the structural directing agent/silica is preferably in the range of 1/160 to 1/38. When the molar ratio of the structural directing agent/silica is smaller than 1/160, extra silica not involving in the formation of the zeolite structure is produced to form silica crystalline or the like, thereby reducing overall purity as well as overall yield. In contrast, when the molar ratio exceeds 1/38 and an excessive amount of the structural directing agent is used, impurities having a structure different from the EU-2 zeolite to be synthesized by forming different structures between the structural directing agents may be formed, or a different morphology may be formed even when the same structure is formed. The molar ratio of the structural directing agent/silica in the range of 1/115 to 1/50 can provide a narrower range of morphology and improve uniformity. This will increase catalytic activities, and is thus preferable.

It is preferable that the mixture containing the water, the silica precursor, the alumina precursor, the pH controlling material, the structural directing material and the surfactant be mixed for 30 minutes to 24 hours. The shorter the mixing time is, the lower the uniformity is resulted, and the longer the mixing time is, the more the seeds are produced, resulting in the formation of large crystals overall and reduced activity.

Additionally, it is preferable that the mixing be performed by adding EU-2 seeds to mix. When the EU-2 seeds are added to synthesize in terms of using the structural directing agent together with the surfactant, not only the one-pot reaction can be carried out more successfully but also the crystallizability of the EU-2 zeolite in the XRD. Further, the production of small and uniform particles can be improved.

The mixture containing the water, the silica precursor, the alumina precursor, the pH controlling material, the structural directing material and the surfactant may be subject to gelation if necessary. The gelation is to well mix the structural directing agent and the surfactant and is preferably performed at a temperature in the range of 25° C. to 80° C. for 3 hours to 24 hours.

When the gelation is carried out at a temperature lower than 25° C., the viscosity of the solution is reduced and silica dissociation and polymerization are significantly slow under the condition in which the seed is not used, which makes it difficult to produce crystals of the EU-2 zeolite structure. When the temperature exceeds 80° C., the structural directing agent and the surfactant are not mixed well and rather reduce performance of the structural directing material or the surfactant.

Meanwhile, when the gelation is performed longer than 3 hours, the EU-2 crystal structure may be stably induced. When the gelation is performed for longer than 24 hours, however, the structural directing agent and the surfactant are interfered by each other and crystals cannot grow and amorphous silica is formed. When the EU-2 seed is used, the EU-2 seed induces the EU-2 zeolite structure even when the gelation time increases. This enables more efficient formation of the hierarchical EU-2 zeolite structure including the mesopores even in the same condition.

It is preferable that to synthesize the hierarchical EU-2 zeolite, thus-obtained mixture or gelated substance be allowed to sit to react at a temperature of 140° C. to 190° C. In other words, at a temperature below 140° C., the EU-2 crystal may not be performed or crystallization may be deteriorated. In contrast, quartz crystals acting as an impurities are formed from the silica precursor, in addition to the EU-2 framework, at a temperature above 190° C., thereby reducing the impurity of a sample. Further, an excessively high temperature may cause decomposition of the structural directing agent and the surfactant.

However, when the reaction temperature lies in the range of 140° C. to 190° C., the purity and size of the EU-2 crystal can be adjusted to be in a preferable range. The reaction temperature may be 150° C. to 180° C. more preferably, and most preferably, may be 160° C. to 180° C.

It is preferable that the reaction be carried out for 36 hours or more. When the reaction continues for at least 36 hours, the hierarchical EU-2 zeolite can be synthesized. The synthesis carried out for more than 72 hours to improve crystallizability may cause a side effect of a large amount of quartz being produced, thereby indicating that it is appropriate that the reaction is carried out for 72 hours or less. When the seed is included, however, an amount of quartz being produced can be reduced when the reaction is carried out for an even longer period of time.

If necessary, the manufacturing of the hierarchical EU-2 zeolite of the present disclosure may further include post-treatment involving washing the synthesized EU-2 zeolite at least once. Drying of the washed EU-2 zeolite and calcination of the dried EU-2 zeolite may further be included. Ion-exchanging and calcination may be followed thereafter. As it is necessary that the synthesized EU-2 zeolite is formed in a H-form to be used as a catalyst, a synthesized Na-form needs to be subject to an ion exchange to be an $NH_4$-form, which will then be converted to the H-form through calcination.

According to the method of the present disclosure, a hierarchical EU-2 zeolite including micropores having a diameter of less than 2 nm and mesopores having a diameter of 2 nm to 50 nm and in which the micropores and the mesopores are hierarchically connected can be obtained.

As the micropores having a diameter of less than 2 nm and the mesopores having a diameter of 2 nm to 50 nm are hierarchically connected in the hierarchical EU-2 zeolite, smooth diffusion of oils having a high boiling point, such as lube base oil, diesel oil, and the like, can be achieved.

It is preferable in the present disclosure that the hierarchical EU-2 zeolite have an EU-2 crystal structure having a silica to alumina molar ratio (SAR) of 90 to 160, more preferably 95 to 140. In the case of said SAR, the hierarchical EU-2 zeolite of the present disclosure can possess an acid point sufficient for the hydroisomerization. When the SAR is below 90, cracking increases thereby decreasing yield of an isomerized fraction, whereas the EU-2 zeolite lacks catalyst active sites when the SAR is above 160, thereby causing insufficient hydroisomerization.

As previously described, the hierarchical EU-2 zeolite of the present disclosure, due to its hierarchical structure in which the micropores and the mesopores are hierarchically connected, has a BET surface area of 190 m$^2$/g to 310 m$^2$/g, preferably 200 m$^2$/g to 300 m$^2$/g due to N$_2$ adsorption-desorption, and has a porous volume of 0.15 cm$^3$/g to 0.40 cm$^3$/g, preferably 0.17 cm$^3$/g to 0.36 cm$^3$/g, at P/P$_0$=0.99.

Specifically, according to the BET method, surface areas of the micropores and the mesopores are respectively 140 m$^2$/g to 240 m$^2$/g, preferably 150 m$^2$/g to 230 m$^2$/g and 40 m$^2$/g to 110 m$^2$/g. The micropore volume is measured to be 0.060 cm$^3$/g to 0.090 cm$^3$/g, preferably 0.063 cm$^3$/g to 0.083 cm$^3$/g by T-plot analysis. The mesopores are pores formed between primary EU-2 particles having the micropores, and a surface area thereof can be represented by measuring an external surface area of the primary particles.

A larger number of the mesopores can be induced by increasing a number of the surfactant ions aggregating around the seed, thereby securing a larger interspace spacing between the seeds.

As to the hierarchical EU-zeolite of the present disclosure, the acid points of the micropores are main catalyst active sites, and the hierarchically connected mesopores provides an effect of smooth diffusion of oils, such as lube base oil, diesel oil, and the like, having a high boiling point, which signifies importance of balance between the micropores and the mesopores. Accordingly, when the surface area and volume of the micropores are below said ranges, the catalytic activity of the obtained hierarchical EU-2 zeolite decreases, whereas when those of the micropores exceed said ranges, the diffusion of oils is not smooth, thereby increasing cracking.

The micropores and mesopores according to the t-plot analysis are not accurately identical to the micropores having a diameter of less than 2 nm and the mesopores having a diameter of 2 nm to 50 nm according to IUPAC, respectively. Further, a conventional analysis method for hierarchical zeolites was Barrett-Joyner-Halenda (BJH) method based on Kelvin Equation, which includes surface tension of a liquid. The method can be applied to mesopores analysis but is not appropriate for analysis of hierarchical zeolites having the micropores in addition to the mesopores. In particular, the method has a fatal error that an artificial pore having a diameter of 4 nm is measured due to a tensile strength effect (TSE).

Degree of hierarchy of the micropores and mesopores of the hierarchical EU-2 zeolite can be analyzed by measuring frequency (content) and accumulative characteristics of each size of the pores using a non-local density functional theory (NLDFT) method. The degree, analyzed by the NLDFT method, can be defined with a hierarchical index (HI) while a ratio of the surface area and volume of the analyzed mesopores can be defined with first HI and second HI, respectively, as follows:

First HI: a ratio of the surface area of the mesopore based on the surface area of total pores according to the NLDFT analysis Second HI: a ratio of the volume of the mesopore based on the volume of total pores according to the NLDFT analysis.

The first and second HIs are indices indicative of the contribution of mesopores to all pores. High first and second HIs refers to a high ratio of mesopore to the total pores, where the first HI is a surface area ratio and the second HI is a volume ratio.

It is preferable for the hierarchical EU-2 zeolite according to the present disclosure that the first HI be 0.10 to 0.40, preferably 0.14 to 0.30, and the first HI be 0.50 to 0.90, preferably 0.55 to 0.80. When the first HI is smaller than 0.10, mesopores are not sufficiently developed, thereby making the lube base oil, diesel oil, and other oils having a high boiling point difficult to smoothly diffuse and increasing cracking reactions. In contrast, when the first HI is greater than 0.4, an amount of the micropores having the catalyst active sites required for hydroisomerization is not sufficient, thereby decreasing the catalytic activities and making it difficult to expect high efficiency of the catalyst.

MODE FOR INVENTION

Hereinafter, the present invention will be described in detail with reference to the following Examples. However, these Examples are for illustrative purposes only, and the scope of the present invention is not limited to these Examples.

Example 1: Hierarchical EU-2 Zeolite and SAR (=103)

1.37 g of hexamethonium chloride as a structural directing agent, 0.46 g of sodium aluminate as an alumnima precursor, 48.16 g of Ludox-HS40 as a silica precursor, and 4.36 g of cetyltrimethyl ammonium (CTAC) as surfactants and 2.49 g of sodium hydroxide as pH-controlling material were dissolved in 68 g of deionized (DI) water to prepare a liquid mixture. The temperature was maintained at room temperature.

A molar ratio of silica:structural directing agent:surfactants:water of the liquid mixture is 1:0.016:0.011:17.4.

A final liquid mixture was added to a hydrothermal synthesis reactor coated with Teflon material, and reacted at 160° C. for 3 days (72 hours) to obtain a zeolite material.

The obtained zeolite material was sufficiently washed with distilled water, dried at 60° C. for 12 hours, and calcined at 550° C. for 5 hours to remove organic surfactant CTAC to prepare a hierarchical zeolite (EU2-Na) having both micropores and mesopores.

Example 2: Example 1+Seed 0.96 g of an EU-2 seed was further added to the liquid mixture of Example 1 to prepare a liquid mixture. The temperature was maintained at room temperature.

A molar ratio of silica:structural directing agent:surfactants:water of the liquid mixture is 1:0.015:0.01:16.5.

A final liquid mixture was added to a hydrothermal synthesis reactor coated with Teflon material, and reacted at 165° C. for 2 days (48 hours) to obtain a zeolite material.

The obtained zeolite material was sufficiently washed with distilled water, dried at 60° C. for 12 hours, and calcined at 550° C. for 5 hours to remove organic surfactant CTAC to prepare a hierarchical zeolite (EU2-Na) having both micropores and mesopores.

Example 3: Example 2+Reduced Structural Directing Agent 1.03 g of hexamethonium chloride as a structural directing agent, 1.03 g of sodium aluminate as an alumnima precursor, 48.16 g of Ludox-HS40 as a silica precursor, and 4.36 g of CTAC, 0.96 g of the EU-2 seed and 2.49 g of sodium hydroxide were dissolved in 68 g of DI water to prepare a liquid mixture. The temperature was maintained at room temperature.

A molar ratio of silica:structural directing agent:surfactants:water of the liquid mixture is 1:0.011:0.01:16.5.

A final liquid mixture was added to a hydrothermal synthesis reactor coated with Teflon material, and reacted at 165° C. for 2 days (48 hours) to obtain a zeolite material.

The obtained zeolite material was sufficiently washed with distilled water, dried at 60° C. for 12 hours, and calcined at 550° C. for 5 hours to remove organic surfactant CTAC to prepare a hierarchical zeolite (EU2-Na) having both micropores and mesopores.

Example 4: Example 3+SAR (=143)

0.82 g of hexamethonium chloride as a structural directing agent, 0.24 g of sodium aluminate as an alumnima precursor, 48.16 g of Ludox-HS40 as a silica precursor, and 4.36 g of CTAC, 0.96 g of the EU-2 seed and 2.55 g of sodium hydroxide were dissolved in 68 g of DI water to prepare a liquid mixture. The temperature was maintained at room temperature.

A molar ratio of silica:structural directing agent:surfactants:water of the liquid mixture is 1:0.009:0.01:16.5.

A final liquid mixture was added to a hydrothermal synthesis reactor coated with Teflon material, and reacted at 165° C. for 2 days (48 hours) to obtain a zeolite material.

The obtained zeolite material was sufficiently washed with distilled water, dried at 60° C. for 12 hours, and calcined at 550° C. for 5 hours to remove organic surfactant CTAC to prepare a hierarchical zeolite (EU2-Na) having both micropores and mesopores.

Example 5: Example 1—Gelling Temperature of 60° C.+SAR (=137)

1.37 g of hexamethonium chloride as a structural directing agent, 0.34 g of sodium aluminate as an alumnima precursor, 48.16 g of Ludox-HS40 as a silica precursor, and 4.36 g of CTAC and 2.55 g of sodium hydroxide were dissolved in 68 g of DI water to prepare a liquid mixture. The temperature was maintained at 60° C.

A molar ratio of silica:structural directing agent:surfactants:water of the liquid mixture is 1:0.016:0.011:17.35.

A final liquid mixture was added to a hydrothermal synthesis reactor coated with Teflon material, and reacted at 160° C. for 3 days (72 hours) to obtain a zeolite material.

The obtained zeolite material was sufficiently washed with distilled water, dried at 60° C. for 12 hours, and calcined at 550° C. for 5 hours to remove organic surfactant CTAC to prepare a hierarchical zeolite (EU2-Na) having both micropores and mesopores.

Comparative Example 1: EU-2 Sample (SAR=134)

2.32 g of hexamethonium chloride as a structural directing agent, 0.39 g of sodium aluminate as an alumnima precursor, 48.23 g of Ludox-HS40 as a silica precursor, and 2.53 g of sodium hydroxide were dissolved in 69 g of DI water to prepare a liquid mixture. The temperature was maintained at room temperature.

A molar ratio of silica:structural directing agent:surfactant:water of the liquid mixture is 1:0.026:0:0.17.

A final liquid mixture was added to a hydrothermal synthesis reactor coated with Teflon material, and reacted at 165° C. for 2 days (48 hours) to obtain a zeolite material. The obtained zeolite material was sufficiently washed with distilled water, dried at 60° C. for 12 hours, and calcined at 550° C. for 5 hours to prepare a hierarchical zeolite (EU2-Na).

Experimental Example 1

X-ray diffraction analysis was performed using a PANalytical X-ray diffractometer. The entire analysis used an EU-2 in a sodium ($Na^+$) form. X-ray diffraction analysis was performed at 40 kV, 30 mA using copper (Cu), and a scan step size was obtained by continuous scanning from 5° to 80° with 0.02626°.

Figure 1:
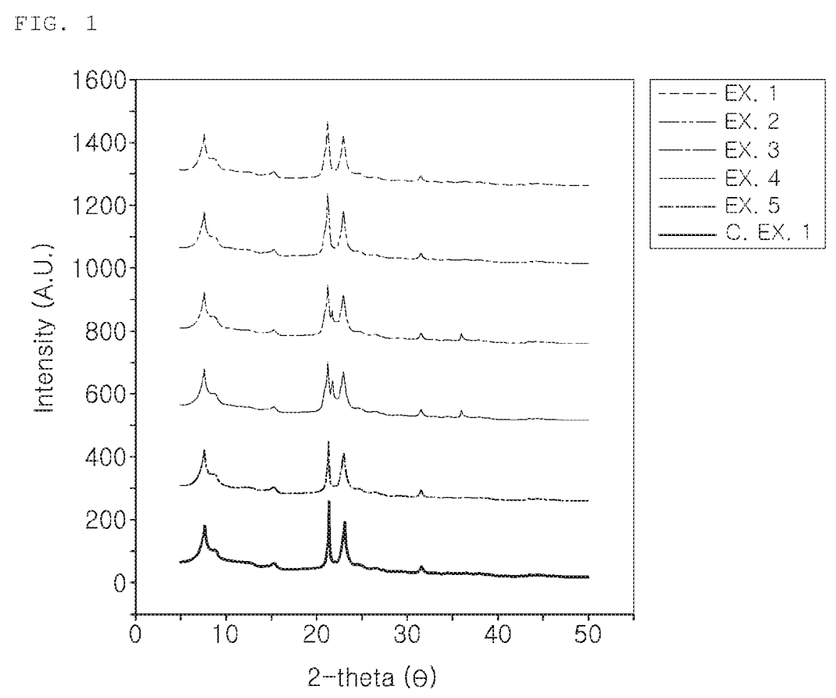
FIG. 1 shows X-ray powder diffraction (XRD) patterns of the EU-2 according to the present disclosure.

FIG. 1 shows a result of the X-ray powder diffraction (XRD) analysis for the zeolites of Examples 1 to 5 and Comparative Example 1.

As shown in the result of FIG. 1, the zeolites prepared in Example 1 to 5 and Comparative Example 1 are all EU-2 zeolites. However, the zeolites of Examples 3 and 4 contained some crosstobalite materials.

Experimental Example 2

Nitrogen adsorption and desorption analysis was analyzed with ASAP2020, and the EU-2 in the form of sodium ($Na^+$) was used as a sample. The analysis was carried out after pre-treatment under vacuum at 350° C. for 3 hours.

The surface areas ($S_{BET}$, $S_{micro}$, $S_{ext}$) of the sample was calculated using a BET equation. A total volume ($V_{total}$) of the pore was derived from an amount of nitrogen adhesion at $P/P0=0.99$ atm, and a volume of micropores ($V_{micro}$) was obtained using a t-plot, while the volume of mesopores was taken as a value calculated by subtracting the volume of the micropores from the total pore volume.

The NLDFT method appropriate for hierarchical zeolite analysis was used to analyze the pore distribution, and N2@77K, Cylindrical Pores in an Oxide Surface module was used.

Major characteristics of Examples and Comparative Example are shown in Table 1 below.

In Table 1 below, SAR represents a silica-to-alumina molar ratio, and $S_{BET}$ represents a BET surface area ($m^2/g$) where $S_{ext}$, $V_{total}$ and $V_{micro}$ represent a surface area ($m^2/g$) of the mesopores, a total pore volume ($cm^3/g$) and a volume of the micropores ($cm^3/g$), respectively. The first HI and the second HI represents a first hierarchical index and a second hierarchical index, respectively.

TABLE 1

|  | SAR | $S_{BET}$ | $S_{micro}$ | $S_{ext}$ | $V_{total}$ | $V_{micro}$ | $1^{st}$ HI | $2^{nd}$ HI |
|---|---|---|---|---|---|---|---|---|
| Example 1 | 103 | 272 | 175 | 97 | 0.30 | 0.071 | 0.27 | 0.78 |
| Example 2 | 110 | 277 | 212 | 65 | 0.30 | 0.087 | 0.26 | 0.76 |
| Example 3 | 106 | 252 | 169 | 83 | 0.34 | 0.070 | 0.23 | 0.78 |
| Example 4 | 143 | 215 | 159 | 56 | 0.30 | 0.066 | 0.21 | 0.76 |
| Example 5 | 137 | 265 | 215 | 50 | 0.18 | 0.087 | 0.16 | 0.58 |
| Comp Ex 1 | 134 | 261 | 241 | 20 | 0.15 | 0.091 | 0.06 | 0.38 |

Figure 2:
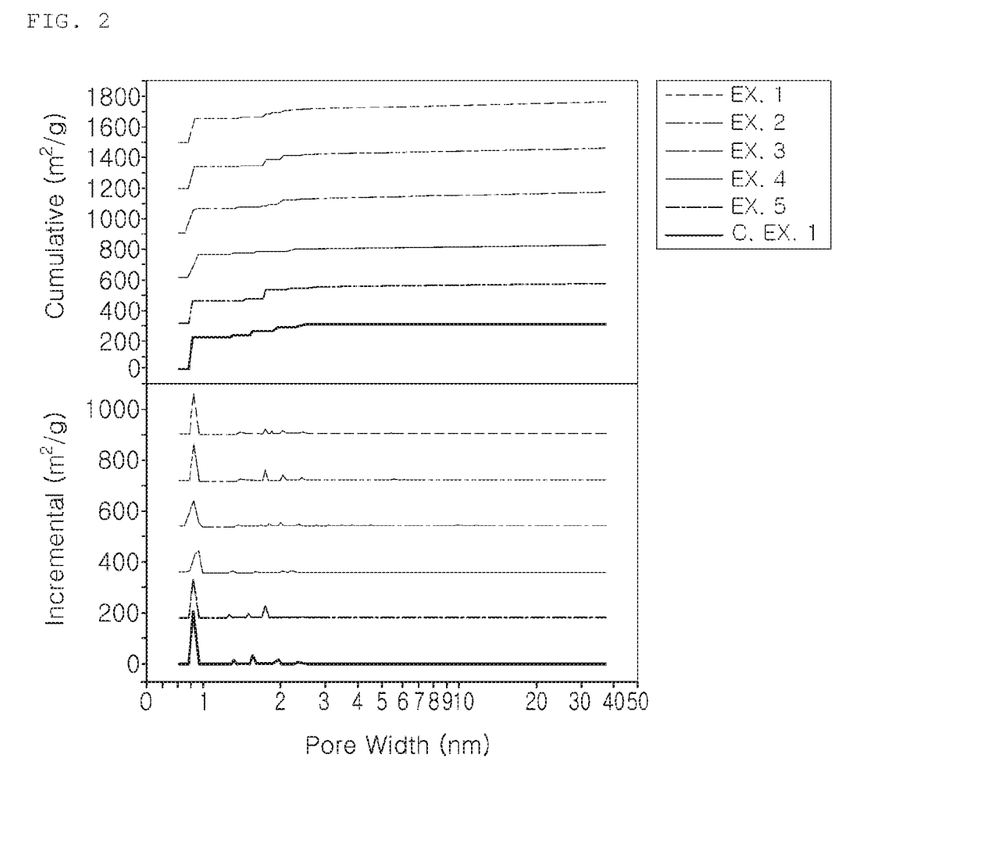
FIG. 2 shows graphs of the catalyst of the present disclosure with respect to distributional and cumulative characteristics of a porous surface area depending on the size, analyzed by non-local density functional theory (NLDFT).
Figure 3:
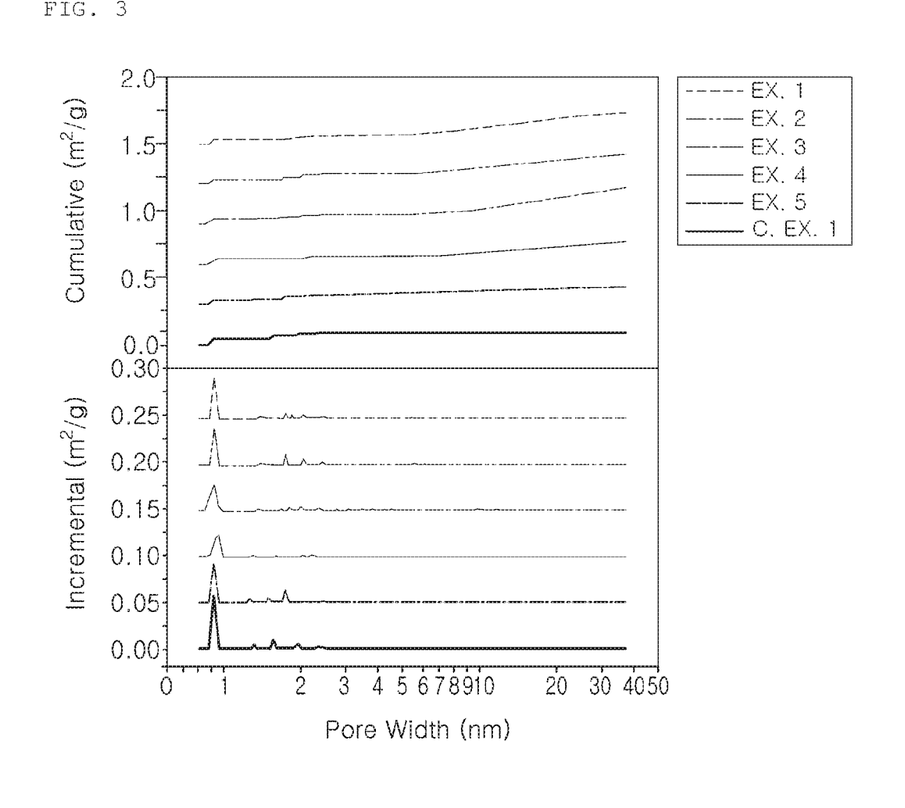
FIG. 3 shows graphs of the catalyst of the present disclosure with respect to distributional and cumulative characteristics of a pore volume depending on the size, analyzed by non-local density functional theory (NLDFT).
Figure 4:
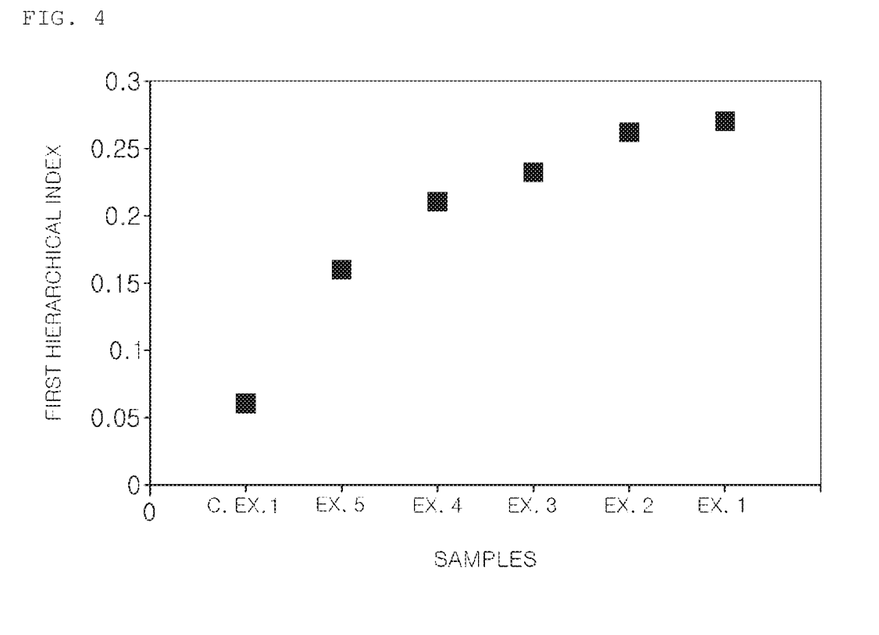
FIG. 4 is a graph showing a first hierarchical index for the zeolite obtained in Examples 1 to 5 and Comparative Example 1.

Further, distributional (frequency and content) and cumulative characteristics of a porous surface area of depending on the size, which was analyzed by the NLDFT is shown in FIG. 2, and distributional and cumulative characteristics of a pore volume depending on the size, analyzed by the NLDFT is shown in FIG. 3. Additionally, the first hierarchical index of the zeolites according to Examples 1 to 5 and Comparative Example 1 are shown in FIG. 4. It can be understood based on Table 1 above that compare to the zeolite obtained in Comparative Example 1, those obtained in Examples 1 to 5 has a larger mesopore surface area representing mesopores, thereby indicating that the mesopores are sufficiently developed. Meanwhile, a total pore volume is about 0.06 cm$^3$/g, compared to the micropore volume in Comparative Example 1, whereas the micropore volume is about 0.1 cm$^3$/g or more in Examples 1 to 5, thus also indicating that the mesopores are sufficiently developed.

FIGS. 2 and 3 showing the pore surface area and the pore volume according to the pore size clearly show peaks separated by the pore size. This indicates that the micropores and the mesopores are separated.

In particular, the EU-2 zeolites obtained in Examples 1 to 5, compared to that obtained in to Comparative Example 1, show decreased peaks for the micropore region and relatively increased peaks for the mesopore region. As shown in Table 1 and FIG. 4, each zeolite obtained in Examples 1 to 5 have significantly higher first and second HIs compared to that obtained in Comparative Example 1. Due to the increased HIs, not only the micropores but also the mesopores are well developed, which indicates the hierarchy of the micropores and mesopores.

Experimental Example 3

(1) Synthesis of Catalyst

A hydrothermally synthesized EU2-Na zeolite was ion exchanged with $NH_4^+$ ion at 60° C. for 2 hours using 1N aqueous ammonium nitrate solution.

The solution was filtered with distilled water and dried, which was repeated once to synthesize EU-2 containing ammonium ions (EU2-NH$_4$).

After washing sufficiently with distilled water, drying at 60° C. for 12 hours, and calcinating at 500° C. for 3 hours, an EU-2 zeolite (EU2-H) containing a hydrogen ion was prepared.

The ion-exchanged EU2-H zeolite was mixed with pseudoboehmite as a binder in a weight ratio of 1:1, and an aqueous solution of [Pt(NH$_3$)$_4$](NO$_3$)$_2$ was impregnated with the mixture of the EU-2 zeolite and the binder so that the weight of the solution becomes 0.6 wt % based on a PT content. The impregnated catalyst was dried at a 120° C. for 3 hours and calcined at 500° C. for 3 hours to prepare a catalyst.

(2) Conversion of n-Hexadecane

The catalyst obtained for an isomerization reaction was charged in a fixed bed reactor having an outer diameter of ½ inch and activated at 260° C. for at least 1 hour to initiate a reaction experiment.

Figure 5:
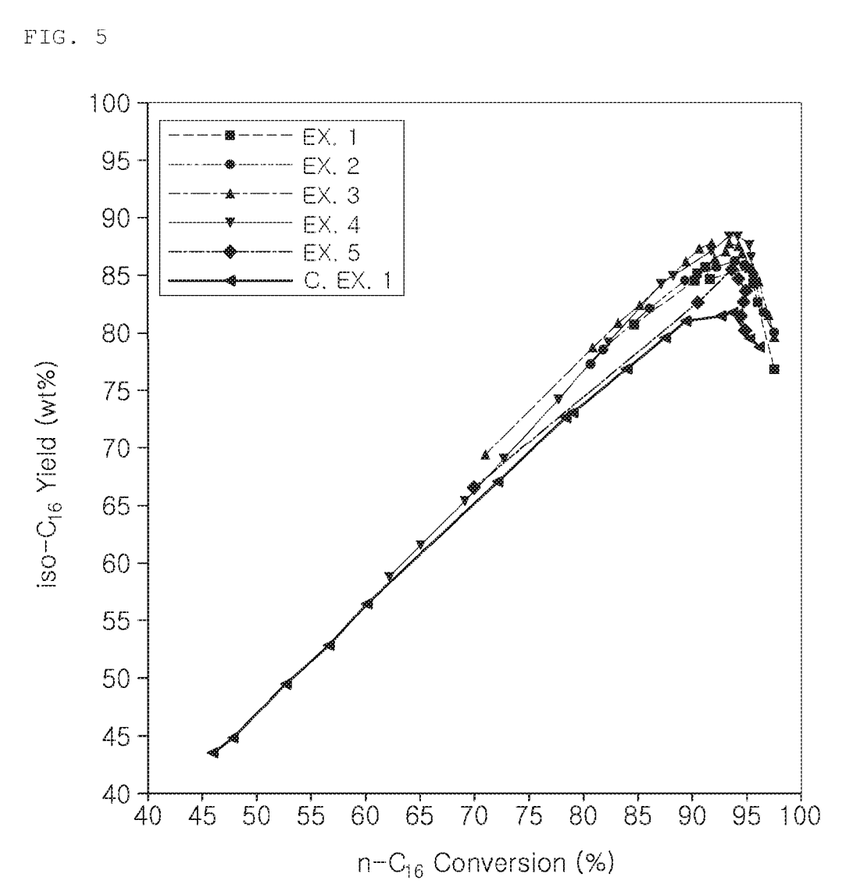
FIG. 5 is a graph showing yield of iso-C16, as a function of an n-C16 conversion rate using the catalyst of the present disclosure (conversion rate vs. yield).
Figure 6:
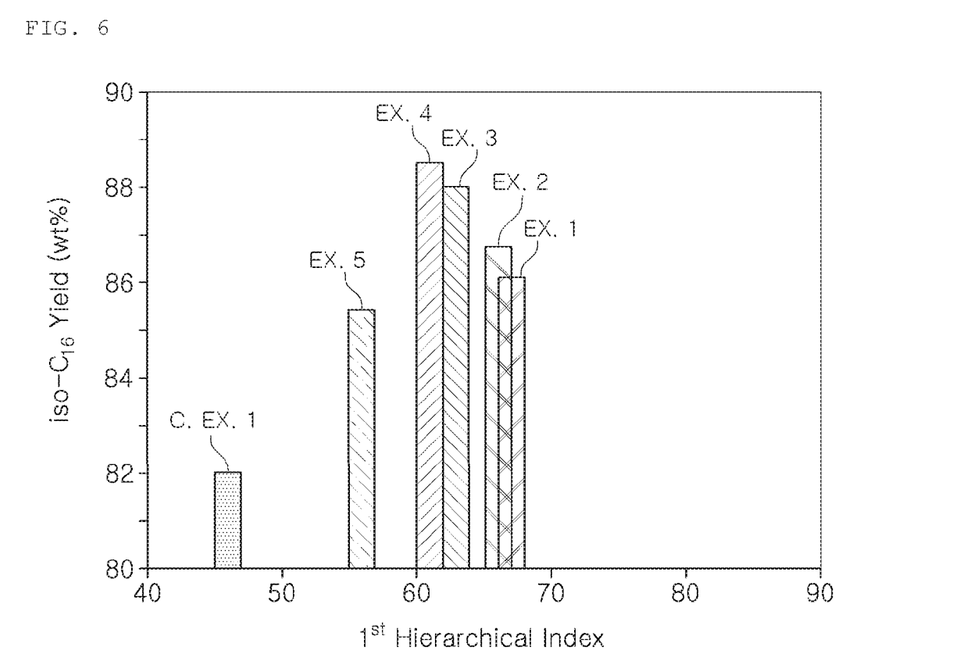
FIG. 6 is a graph showing isomerization yield according to the hierarchical index of the catalyst.

The reaction experiment began with injecting an n-hexadecane feed into the reactor using a pump at a rate of 1 g/hr. The reaction condition and the hydrogen injection were controlled at 30 atm and 650 cc/hr, respectively. Yield of iso-C$_{16}$ as a function of the n-C16 conversion is shown in a graph of FIG. 5, and that of isomerization reaction according to the first HI of the catalyst is shown in a graph of FIG. 6, and are further shown in Table 2.

TABLE 2

|  | n-C$_{16}$ conversion rate (%) | i-C$_{16}$ yield (wt %) | Cracking rate (wt %) |
|---|---|---|---|
| Example 1 | 94.9 | 86.1 | 8.8 |
| Example 2 | 93.9 | 86.7 | 7.2 |
| Example 3 | 93.6 | 88.0 | 5.6 |
| Example 4 | 93.8 | 88.5 | 5.3 |
| Example 5 | 93.8 | 85.4 | 8.4 |
| Comp Ex 1 | 93.5 | 82.0 | 11.5 |

The hydroisomerization process may be carried out with respect to the hydrocarbon raw material, for example, at a temperature of about 200° C. to 500° C. (specifically about 220° C. to 450° C., more specifically about 240° C. to 400° C.), hydrogen pressure of about 1 atm to 200 atm (specifically about 100 atm to 180 atm, more specifically about 130 atm to 150 atm), liquid hourly space velocity (LHSV) of 0.1 hr$^{-1}$ to 10 hr$^{-1}$ (specifically about 0.5 hr$^{-1}$ to 5 hr$^{-1}$, more specifically about 1 hr$^{-1}$ to 2 hr$^{-1}$) and a hydrogen/supplied raw material ratio of 56 nm$^3$/m$^3$ to 1780 nm$^3$/m$^3$ (specifically about 200 nm$^3$/m$^3$ to 100 nm$^3$/m$^3$, more specifically 480 nm$^3$/m$^3$ to 530 nm$^3$/m$^3$).

While the present invention has been shown and described in connection with the embodiments, it will be apparent to those skilled in the art that modifications and variations can be made without departing from the spirit and scope of the invention as defined by the appended claims.

The invention claimed is:

1. A method for manufacturing a hierarchical EU-2 zeolite, comprising:
   reacting a mixture comprising water, a silica precursor, an alumina precursor, a pH adjusting material, at least one structural directing agent and at least one surfactant; and
   drying and heat-treating,
   wherein the structural directing agent and the surfactant have different numbers of carbon atoms, and the surfactant has a larger number of carbon atoms than the structural directing agent, and
   wherein the mixture comprises the structural directing agent at a molar ratio of 1/160 to 1/38 to silica.

2. The method of claim 1, wherein a main chain of the structural directing agent has 10 carbon atoms or less and has an ammonium functional group, and a main chain of the surfactant has 11 carbon atoms or more and has an ammonium functional group.

3. The method of claim 1, wherein the structural directing agent is at least one selected from the group consisting of tetramethylammonium bromide, tetramethylammonium chloride, tetramethylammonium hydroxide, tetraethylammonium bromide, tetraethylammonium chloride, tetraethylammonium hydroxide, tetraethylammonium tetrafluoroborate, hexamethonium chloride, hexamethonium bromide.

4. The method of claim 1, wherein the surfactant is at least one selected from the group consisting of cetyltrimethylammonium bromide, cetyltrimethylammonium chloride and cetylpyridinium chloride.

5. The method of claim 1, wherein the silica precursor is at least one selected from the group consisting of fumed silica, precipitated silica, colloidal silica, sodium silicate, tetramethyl orthosilicate, tetraethyl ortho silicate, borosilicate and fluorosilicate.

6. The method of claim 1, wherein the alumina precursor is at least one selected from the group consisting of sodium aluminate, sodium aluminum sulfate and aluminum.

7. The method of claim 1, wherein the pH adjusting material is at least one selected from the group consisting of lithium hydroxide, sodium hydroxide, potassium hydroxide, rubidium hydroxide, cesium hydroxide and ammonium hydroxide.

8. The method of claim 1, wherein the mixture comprises the silica at a molar ratio of 0.05 to 0.13 to water.

9. The method of claim 1, wherein the mixture comprises the surfactant at a molar ratio of 1/200 to 1/20 to the silica.

10. The method of claim 1, wherein the mixture comprises an EU-2 seed.

11. The method of claim 1, wherein the reaction is carried out at a temperature range of 140° C. to 190° C. for 24 hours to 72 hours.

12. The method of claim 1, wherein the mixture is reacted after mixing for 30 minutes to 24 hours.

13. The method of claim 1, wherein the mixture is gelled at 25° C. to 80° C. for 3 hours to 24 hours.

14. An EU-2 zeolite having an EU-2 crystal structure and comprising Micropores having a diameter of smaller than 2 nm and mesopores having a diameter of 2 nm to 50 nm hierarchically connected to each other,
wherein the micropores have a volume of 0.060 cm$^3$/g to 0.09 cm$^3$/g.

15. The EU-2 zeolite of claim 14, wherein the EU-2 zeolite has a surface area of the micropores of 140 m$^2$/g to 240 m$^2$/g and a surface area of the mesopores of 40 m$^2$/g to 110 m$^2$/g.

16. The EU-2 zeolite of claim 14, wherein the EU-2 zeolite has a silica to alumina molar ratio (SAR) of 90 to 160.

17. The EU-2 zeolite of claim 14, wherein the EU-2 zeolite has a total BET surface area of 190 m$^2$/g to 310 m$^2$/g.

18. The EU-2 zeolite of claim 14, wherein the EU-2 zeolite has a second hierarchical index of 0.50 to 0.90.

* * * * *